United States Patent Office

3,515,702
Patented June 2, 1970

3,515,702
LAUROLACTAM COPOLYAMIDE SHAPED
ARTICLES HAVING HIGHLY ADHESIVE
SURFACES
Fritz Raabe, Bonn (Rhine), Germany, assignor to Dr.
Plate G.m.b.H. Chemische Fabrik, Bonn, Germany, a
corporation of Germany
No Drawing. Filed Feb. 6, 1967, Ser. No. 614,018
Claims priority, application Germany, Feb. 11, 1966,
P 38,767
Int. Cl. C08g 20/10
U.S. Cl. 260—78    1 Claim

ABSTRACT OF THE DISCLOSURE

There is provided a plastic article of manufacture having highly adhesive surfaces at elevated temperatures formed by condensing together 80% to 20% by weight laurolactam and 20% to 80% by weight of at least one other polymerizable amide.

---

The present invention relates to the use of mixed polyamides for the production of shaped articles having highly adhesive surfaces at an elevated temperature.

Polyamide shaped articles consisting of polyamide plastics and having highly adhesive surfaces at elevated temperatures are useful in many instances. Filaments of such polyamides may be processed, for instance, to felts, filtering cloths or pads. For this end, the adhesive filaments are cut into short fibers and generally are mixed with other fibers; thereafter, these fibers are floated in water or another suitable liquid and are filtered off on a running sieve of a paper-machine, for instance. Thereafter, the thus obtained layer of fibers is dried at a suitable temperature. When heating and pressing, the fibers stick together at the places of contact, thus producing a continuous sheet upon cooling and curing.

Polyamide sheets with highly adhesive surfaces at an elevated temperature are used for covering articles of various types, for instance. Such sheets may be furthermore used as a binder layer for two different materials, for which there is no suitable adhesive or which have to be bonded together within only a short period of time. When using a polyamide sheet having adhesive surfaces at an elevated temperature, the bonding is accomplished upon cooling. There is no drying or evaporation of a solvent for the adhesive, which steps are necessary with the adhesives known up to now.

It is an object of the present invention to provide shaped articles, in particular in filament, fiber or sheet form, having highly adhesive surfaces at an elevated temperature.

Another object of the present invention is to provide polyamide plastics which are useful for the production of shaped articles having highly adhesive surfaces at elevated temperatures.

Other objects of the present invention and advantages thereof will become apparent as the description proceeds.

The present invention relates to the use of copolyamides comprising 80 to 20% by weight of laurolactam groups and 20 to 80% by weight of groups of one or several other polyamide forming products, for the production of shaped articles having highly adhesive surfaces at elevated temperatures.

It has surprisingly been found that mixed polyamides or, more correctly, copolyamides which are produced in usual manners from laurolactam (the starting product for the production of C12-polyamide) and one or several other polyamide forming products at the proportions given hereinabove, may be used for the production of shaped articles having extremely highly adhesive surfaces at elevated temperatures. The shaped articles produced by using the copolyamides in accordance with the present invention, for instance, the filaments cut into short pieces or sheets, have highly adhesive surfaces when heated at an elevated temperature, for instance at temperatures of from about 110 to about 190° C. Upon cooling to room temperature, the surfaces of the shaped articles solidify again.

Therefore, the present invention provides various ways to use copolyamides comprising laurolactam groups, for the bonding of articles.

The shaped articles having highly adhesive surfaces may be produced in accordance with the present invention from copolyamides in manners known per se, such as extruding, spinning or the like. For instance, filaments may be spun from the copolyamides, which filaments, after being cut to the desired length, are for instance mixed with the same amount of known C6-polyamide fibers and are processed to felts, fleeces or pads. Furthermore, sheets may be produced which have highly adhesive surfaces upon heating and pressing. Articles of various types, such as rigid or elastic articles, webs and layers, such as flocks, may be bonded together by the aid of such sheets. Sheets produced in accordance with the present invention may be used for instance for covering paper and paperboard and may furthermore be used as bonding layer for wood or metals.

Mixed polyamines or copolymers to be used in accordance with the present invention may be produced in manners known per se, starting from laurolactac and one or several other polyamide forming products. As in the production of C12-polyamides from laurolactam the production is generally effected at temperatures of about 290° C. and at pressures of about 19 at. The used catalysts, polymerization stopping agents (chain terminating agents) and/or other additives and the process conditions known for the polymerization of laurolactam are applied. It is particularly advantageous to carry out the polymerization with the exclusion of air, i.e. in an inert gas.

The molecular weight of the thus obtained copolyamides is controlled in manners known from the production of C12-polyamides, in accordance with the intended use. When producing sheets and in particular tube-like sheets, the copolymer in general should have a rather high molecular weight, i.e. it has to be rather highly viscous. Copolyamide viscosity for the production of sheets ranges advantageously at about 1.9 and higher values. This figure is the viscosity of a 0.5% solution of the copolyamide in m-cresol.

In order to improve the economy of the product, this copolyamide based upon laurolactam further comprises groupments of polymer units derived from, caprolactam and/or hexamethylene diamine adipate. If several other groupments are contained in the copolyamide besides laurolactam groupments, the total of these further groupments should be within the given range. Further suitable other groupments are for instance those formed when starting from hexamethylene diamine 6,10-sebacate, caprolactam and/or hexamethylene diamine dodecane 6,12-dicarboxylic acid, and mixtures thereof. It is advantageous to use such other polyamide groupments, the starting materials for which are available and cheap.

The copolyamides used in accordance with the present invention may further comprise other known additives such as dye stuffs.

The copolyamides used in accordance with the present invention represent copolymers obtained by copolymerizing a mixture of laurolactam with other polyamide forming products. The described surprising results are not obtained if laurolactam and caprolactam, for instance, are polymerized separately to mono-polyamides and thereafter are mixed together in the molten state.

As used herein, C12-polyamide is the polyamide produced from laurolactam, and C6-polyamide is the polyamide produced from caprolactam, for instance. C6,6-polyamide is for instance the polyamide produced from hexamethylene diamine and adipic acid, the first figure giving the number of carbon atoms in the amine component and the second figure giving the number of carbon atoms in the acid component. This is in correspondence with the internationally acknowledged nomenclature for characterizing polyamides. Thus, the copolyamide produced, for instance, from laurin lactame and caprolactam comprises the groupments of C12-polyamide and C6-polyamide in the macromolecule in a statistic distribution.

In order to facilitate the polymerization of laurin lactame, it is known to add to the starting mixture as catalyst small amounts of amide forming products, having at least 6 carbon atoms in a chain (see Belgium Pat. 618,481). Thus obtained polyamides are said to be used in known manners. The production of shaped articles having highly adhesive surfaces at elevated temperatures is not disclosed. It is surprising and not obvious over the above Belgian patent that copolyamides of the composition in accordance with the present invention, i.e. that laurin lactame copolyamides containing a substantial amount of other polyamides, may be used for the production of shaped articles having highly adhesive surfaces at elevated temperatures. Since long, there has been a great lack in such products.

The following examples serve to illustrate the present invention without, however, limiting the same thereto.

EXAMPLE 1

60 parts by weight of laurin lactame, 40 parts by weight of caprolactam, 0.5 part by weight of adipic acid, and 8 parts by weight of water are placed into an autoclave. In order to remove oxygen, the autoclave is thoroughly ventilated with nitrogen. The starting mixture then is heated to 290° C. within a period of 3 hours. During this time the pressure rises to 19 to 21 at. The reaction mixture is heated for a further period of time of 4 hours at 290° C. and about 21 at. Thereafter, pressure is released within a period of about 2 hours and the reaction mixture is further polymerized for 1 hour at 290° C. Thereafter, polymerization is completed. The polymer is spun and granulated at 11 at. of nitrogen pressure. Either in the pure state or after mixing with a filler or a dye stuff, the granular product is used preferably for the production of filaments or sheets in an extruder. The sheets thus obtained are used for bonding several different webs or products, i.e. for hot sealing. Cut fibers are used for the production of fleeces, felts, pads, filter cloths or filter papers.

EXAMPLE 2

60 parts by weight of laurolactam, 40 parts by weight of hexamethylene diamine adipate, 0.1 part by weight of acetic acid and 8 parts by weight of water are placed into an autoclave. After removal of oxygen by ventilation with nitrogen, the mixture is heated to 290° C. within a period of about three hours. The pressure rises to 19 to 21 at. Thereafter, the mixture is kept at 290° C. at about 21 at. for another 4 hours. Pressure now is released within a period of 2 hours and after polymerization is effected at 290° C. for another hour. Thereafter, polymerization is completed. The polymer is spun under nitrogen pressure, cooled and granulated. Foils produced from the granular material by means of an extruder are used as binding layer when covering or flocking a base layer with an exterior layer. Filaments are useful as thermoplastic adhesive filaments in connection with webs to be pressed upon a suitable base material at an elevated temperature.

EXAMPLE 3

40 parts by weight of laurin lactame, 40 parts by weight of caprolactam, 20 parts by weight of hexamethylene diamine adipate, and 8 parts by weight of water are placed into an autoclave and copolymerized as described in Example 2.

What I claim is:
1. An article of manufacture having highly adhesive surfaces at elevated temperatures in the range of from 110° C. to 190° C. consisting essentially of a mixed polyamide condensation product of:
  (a) laurolactam; and
  (b) a co-condensible member selected from the group consisting of caprolactam, hexamethylene diamine adipate, hexamethylene diamine sebacate, and mixtures thereof;
in which mixed polyamide the weight percent of units derived from laurolactam is from 80% to 20% and the weight percent of units derived from the co-condensible member is from 20% to 80%.

References Cited
UNITED STATES PATENTS

| | | | |
|---|---|---|---|
| 2,252,555 | 8/1941 | Carothers | 260—78 |
| 3,216,976 | 11/1965 | Schwartz et al. | 260—78 |
| 3,317,482 | 5/1967 | Kunde et al. | 260—78 |
| 3,320,215 | 5/1967 | Conte | 260—78 |
| 3,321,447 | 5/1967 | Kunde et al. | 260—78 |
| 3,410,832 | 11/1968 | Griehl et al. | 260—78 |

FOREIGN PATENTS 1,197,623  7/1965  Germany.

HAROLD D. ANDERSON, Primary Examiner

U.S. Cl. X.R.

117—161; 161—227; 260—33.4